(12) United States Patent
Ge et al.

(10) Patent No.: US 10,635,892 B2
(45) Date of Patent: Apr. 28, 2020

(54) DISPLAY CONTROL METHOD AND APPARATUS

(71) Applicants: TENCENT TECHNOLOGY (SHENZHEN) COMPANY LIMITED, Shenzhen (CN); CHONGQING UNIVERSITY OF POSTS AND TELECOMMUNICATIONS, Chongqing (CN)

(72) Inventors: Junwei Ge, Shenzhen (CN); Qingling Wang, Shenzhen (CN); Zhangqun Fan, Shenzhen (CN); Weiwei Zhang, Shenzhen (CN); Yuyan Cui, Shenzhen (CN)

(73) Assignees: TENCENT TECHNOLOGY (SHENZHEN) COMPANY LIMITED, Shenzhen (CN); CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 45 days.

(21) Appl. No.: 15/854,633

(22) Filed: Dec. 26, 2017

(65) Prior Publication Data
US 2018/0121711 A1    May 3, 2018

Related U.S. Application Data

(63) Continuation of application No. PCT/CN2016/084586, filed on Jun. 2, 2016.

(30) Foreign Application Priority Data

Jul. 9, 2015    (CN) .......................... 2015 1 0400254
Jul. 22, 2015   (CN) .......................... 2015 1 0433741
Nov. 2, 2015    (CN) .......................... 2015 1 0731860

(51) Int. Cl.
*G06K 9/00*    (2006.01)
*G06F 3/0484*  (2013.01)
(Continued)

(52) U.S. Cl.
CPC ......... *G06K 9/00281* (2013.01); *G06F 3/012* (2013.01); *G06F 3/0484* (2013.01);
(Continued)

(58) Field of Classification Search
CPC ........... G06K 9/00281; G06K 9/00288; G06K 9/00287; G06K 9/00222; G06K 9/00248; H04N 19/593; G06F 3/0484
See application file for complete search history.

(56) References Cited

U.S. PATENT DOCUMENTS 5,680,481 A * 10/1997 Prasad ............... G06K 9/00281
                                                      382/190
7,221,809 B2 * 5/2007 Geng ................. G06K 9/00201
                                                      382/280
(Continued)

FOREIGN PATENT DOCUMENTS

CN    102098373    6/2011
CN    102841725    12/2012
(Continued)

OTHER PUBLICATIONS

International Search Report dated Sep. 1, 2016 in PCT/CN2016/084586 filed Jun. 2, 2016. (With English Translation).

*Primary Examiner* — Amir Alavi
(74) *Attorney, Agent, or Firm* — Oblon, McClelland, Maier & Neustadt, L.L.P.

(57) ABSTRACT

Aspects of the disclosure provide a method for display control. The method includes capturing, by a camera in a terminal device that is in use by a user, a first face image and a second face image of the user, extracting a first face
(Continued)

fiducial of a characteristic point on a face of the user from the first face image and a second face fiducial of the characteristic point on the face of the user from the second face image, determining a face location offset value based on the first face fiducial and the second face fiducial, determining, based on the face location offset value, a display location offset value of content to be displayed on a display screen of the terminal device, and performing a display control of the content on the display screen according to the display location offset value.

20 Claims, 9 Drawing Sheets

(51) Int. Cl.
G06F 3/01 (2006.01)
H04N 19/593 (2014.01)

(52) U.S. Cl.
CPC ..... *G06K 9/00261* (2013.01); *G06K 9/00288* (2013.01); *H04N 19/593* (2014.11); *G06F 2203/04806* (2013.01)

(56) References Cited

U.S. PATENT DOCUMENTS

| | | | | |
|---|---|---|---|---|
| 7,317,816 | B2* | 1/2008 | Ray | G06K 9/00281 382/118 |
| 8,571,332 | B2* | 10/2013 | Kumar | G06K 9/6269 382/118 |
| 8,811,726 | B2* | 8/2014 | Belhumeur | G06K 9/00281 382/103 |
| 2014/0186753 | A1* | 7/2014 | Okamura | G03F 1/24 430/5 |
| 2015/0235073 | A1* | 8/2015 | Hua | G06K 9/00288 382/118 |
| 2018/0121711 | A1* | 5/2018 | Ge | G06F 3/0484 |
| 2018/0210546 | A1* | 7/2018 | Rawlinson | G06K 9/00604 |

FOREIGN PATENT DOCUMENTS

| | | |
|---|---|---|
| CN | 103019507 | 4/2013 |
| CN | 103176623 | 6/2013 |
| CN | 103885593 | 6/2014 |
| CN | 104394452 | 3/2015 |
| CN | 104464579 | 3/2015 |

* cited by examiner

DISPLAY CONTROL METHOD AND APPARATUS

RELATED APPLICATION

This application is a continuation of International Application No. PCT/CN2016/084586, filed on Jun. 2, 2016, which claims priority to Patent Application No. 201510433741.3, entitled "METHOD AND APPARATUS FOR CONTROLLING MEDIA PRESENTATION ON MOBILE TERMINAL" filed with the Chinese Patent Office on Jul. 22, 2015, Patent Application No. 201510400254.7, entitled "DISPLAY CONTROL METHOD, AND MOBILE TERMINAL" filed with the Chinese Patent Office on Jul. 9, 2015, and Patent Application No. 201510731860.7, entitled "SCREEN CONTENT ADJUSTMENT METHOD AND DEVICE" filed with the Chinese Patent Office on Nov. 2, 2015, which are incorporated herein by reference in their entirety.

FIELD OF THE TECHNOLOGY

The present disclosure relates to the field of computer communication technologies, and more specifically, to a display control method and apparatus.

BACKGROUND OF THE DISCLOSURE

With the development of computers and communications technologies, portable terminals such as mobile phones, personal digital assistants (PDA), and tablet computers are more common in users' daily life. With the help of these terminal devices, users can communicate, photograph, view display content, and conduct other entertainment activities such as play games.

Wobble usually occurs in a process in which a terminal is used. For example, wobble occurs when a user is walking or when the user is on a vehicle, such as a bike, a car, a train, and the like for a trip. Wobble herein refers to wobble of display content that is viewed relative to eyes of the user. Wobble occurs because when the user is in a non-stationary state, it is very hard to keep the handheld terminal device stationary relative to the eyes. Consequently, the user may feel dizziness or similar uncomfortableness if the user has stared at a screen for a long time. In addition, when wobble occurs, a distance between the screen of the terminal and a face of the user is changed. In this case, a display angle, a display direction and the like of content displayed on the screen are changed as the distance between the screen of the terminal and the face of the user is changed, leading to impact on content browsing.

SUMMARY

The present disclosure is provided in view of the foregoing problem that exists in the related technology. The present disclosure provides a display control method and apparatus.

Aspects of the disclosure provide a method for display control. The method includes capturing, by a camera in a terminal device that is in use by a user, a first face image and a second face image of the user, extracting a first face fiducial of a characteristic point on a face of the user from the first face image and a second face fiducial of the characteristic point on the face of the user from the second face image, determining a face location offset value based on the first face fiducial and the second face fiducial, determining, based on the face location offset value, a display location offset value of content to be displayed on a display screen of the terminal device, and performing a display control of the content on the display screen according to the display location offset value.

In an embodiment, to determine the face location offset value based on the first face fiducial and the second face fiducial, the method includes obtaining a first image coordinate of the first face fiducial and a second image coordinate of the second face fiducial, calculating a first spatial coordinate of the first face fiducial in a camera coordinate system based on the first image coordinate and a second spatial coordinate of the second face fiducial in the camera coordinate system based on the second image coordinate, and determining a coordinate offset value of the second spatial coordinate relative to the first spatial coordinate as the face location offset value.

In an example, the method includes receiving length measurements between a plurality of characteristic points on the face of the user. Thus, in an embodiment, to calculate the first spatial coordinate of the first face fiducial in the camera coordinate system based on the first image coordinate, the method includes normalizing first image coordinates of first face fiducials in the first face image for the plurality of characteristic points in the camera coordinate system, calculating first unit vectors between an origin in the camera coordinate system and the first face fiducials according to the normalized first image coordinates, calculating first angles between the first unit vectors, calculating distances between the origin to the first face fiducials according to the received length measurements between the plurality of characteristic points and the angles between the unit vectors, and calculating, according to the distances between the origin to the first face fiducials and the unit vectors, first spatial coordinates that correspond to the first face fiducials in the camera coordinate system.

According to another aspect of the disclosure, to determine the face location offset value based on the first face fiducial and the second face fiducial, the method includes obtaining a first image coordinate of the first face fiducial and a second image coordinate of the second face fiducial, and determining a coordinate offset value of the second image coordinate relative to the first image coordinate as the face location offset value.

In an embodiment, to determine, based on the face location offset value, the display location offset value of content to display on the display screen of the terminal device, the method includes determining whether the face location offset value is greater than a preset offset threshold; and when the face location offset value is greater than the preset offset threshold, the method includes determining the display location offset value according to the face location offset value and a preset maximum allowable offset value.

In an example, the face location offset value comprises at least one of an X coordinate offset value, a Y coordinate offset value, and/or a distance offset value; the preset threshold comprises at least one of an X coordinate offset threshold, a Y coordinate offset threshold, and/or a distance offset threshold; and the maximum allowable offset value comprises: a maximum offset value in an X axis direction and a maximum offset value in a Y axis direction. To determine the display location offset value, in an example, the method includes determining the display location offset value in the X axis direction as a smaller one between the X coordinate offset value and the maximum offset value in the X axis direction, and/or determining the display location offset value in the Y axis direction as a smaller one between the Y coordinate offset value and the maximum offset value in the Y axis direction.

According to an aspect of the disclosure, the method also includes determining a moving speed and/or an acceleration of the face location offset of the second face fiducial relative to the first face fiducial, and determining a display location offset adjustment speed according to the moving speed and/or the acceleration.

In an example, the first face image and the second face image are two adjacent face images in multiple face images that are obtained within a preset period or at a preset time interval.

To perform the display control of the content on the display screen according to the display location offset value, in an example, the method includes at least one of: shifting the content on the display screen, zooming-in the content on the display screen; and zooming-out the content on the display screen.

Aspects of the disclosure provide an apparatus having a camera, processing circuitry and a display screen. The camera is configured to capture a first face image and a second face image of a user. The display screen is configured to display content to the user. The processing circuitry is configured to extract a first face fiducial of a characteristic point on a face of the user from the first face image and a second face fiducial of the characteristic point on the face of the user from the second face image, determine a face location offset value based on the first face fiducial and the second face fiducial, determine, based on the face location offset value, a display location offset value of the content to display on the display screen, and perform a display control of the content on the display screen according to the display location offset value.

Aspects of the disclosure provide a method for display control. The method includes obtaining one or more moving parameters of a terminal device, determining a relative displacement between the terminal device and a user according to the one or more moving parameters, controlling content to be displayed on a display screen of the terminal device to move in an opposite direction to the relative displacement.

Aspects of the disclosure provide an information processing apparatus having processing circuitry. The processing circuitry is configured to obtain one or more moving parameters of the apparatus, determine a relative displacement between the apparatus and a user according to the one or more moving parameters, and control content to be displayed on a display screen to move in an opposite direction to the relative displacement.

With the help of any one of the foregoing technical solutions of the present disclosure, when wobble occurs, display on a screen of a terminal may be adjusted according to motion of a face of a user of the terminal, so that a relative displacement between the screen of the terminal and the user is minimized or even that the screen and the user are relatively stationary. In this way, uncomfortableness caused by wobble is reduced or eliminated.

DESCRIPTION OF EMBODIMENTS

Figure 1:
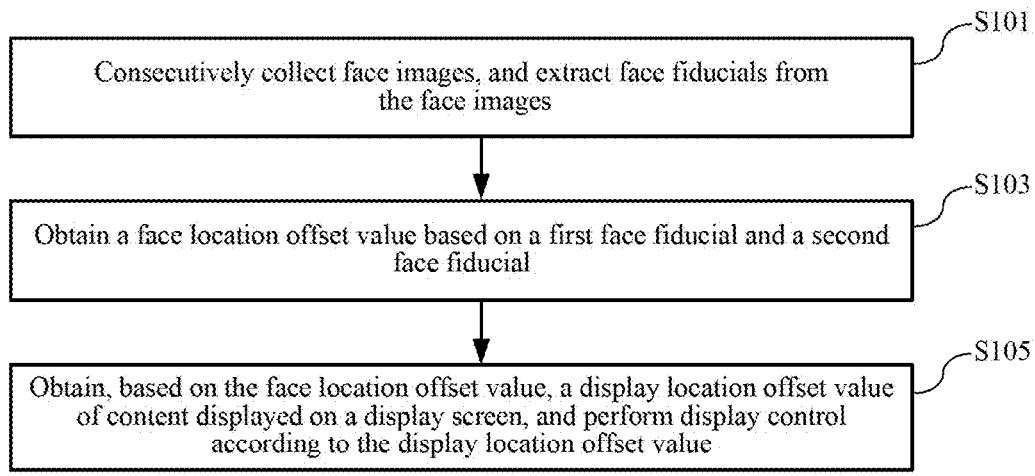
FIG. 1 is a schematic flowchart of a display control method according to a first embodiment of the present disclosure.

In the following descriptions, "face images" refer to multiple face images consecutively obtained within a preset period, or multiple face images consecutively obtained at a preset time interval. For ease of description, in the specification, two adjacent face images in multiple collected face images are used in an example for description. In the following descriptions, in an example, face images are collected by using a front-facing camera of a terminal device. A "Face fiducial" refers to a point that is in an image and that corresponds to a characteristic point on a face of a user. The characteristic point on the face includes but is not limited to at least one of a nose, eyes, a mouth, or the like of the user. Alternatively, the face fiducial may be set to be a crosspoint between a connection line that is between two eyes and a connection line that is between the nose and the mouth, a focal point of an eye, a focal point of the two eyes, or the like that is in a face image.

A manner in which "display control" or "display adjustment" is performed and that is mentioned in the specification includes but is not limited to one of or a combination of the following manners: translation processing, zoom-in processing, zoom-out processing, or the like. A terminal device involved in embodiments of the present disclosure may include but is not limited to: a terminal device capable of displaying content data, such as a tablet computer, a smartphone, a notebook computer, a PDA, a palmtop computer, a personal computer, or a mobile Internet device (MID); and a mobile terminal such as a handheld game console, an in-vehicle device such as an in-vehicle computer display screen, a point of sales (Point of Sales, POS) and another handheld device. Content displayed on a screen may include various media, such as characters, pictures, images, and the like.

Based on the above overview, the following further describes the embodiments of the present disclosure in detail with reference to the accompanying drawings.

As described above, in the related technology, wobble occurs when a user uses a portable terminal device or when the user is moving. In this case, in the technical solutions provided in the embodiments of the present disclosure, display on a screen is adjusted and controlled according to location changes of a face of a user or location changes of a user relative to a terminal. In this way, the changes of the relative location can be balanced or counterbalanced, thereby reducing or eliminating a poor screen viewing effect caused by wobble.

First Embodiment

First, as a terminal used for implementing this embodiment and the following second embodiment, the terminal may be configured with an anti-wobble function at delivery. An anti-wobble function enabling instruction of a user is responded to, and a front-facing camera of the terminal is turned on. That is, when the user enables an anti-wobble function switch, the front-facing camera of the terminal is turned on and an anti-wobble processing function is enabled. An anti-wobble function disabling instruction of the user is responded to, the front-facing camera of the terminal is turned off, and the anti-wobble processing function is disabled. The anti-wobble function is implemented with an enabling and disabling switch that can be operated by the user, the anti-wobble processing is performed when the user has an anti-wobble (that is, a display control) requirement, and the anti-wobble processing is stopped when the user does not have an anti-wobble requirement, thereby saving system resources and reducing resource usage of the terminal device. Certainly, the method in this embodiment of the present disclosure may also be implemented by downloading, by the user, an application (APP) that integrates the display control method according to this embodiment of the present disclosure. This is not limited in the present disclosure.

The first embodiment provides a display control method. In this method, display on a screen is controlled according to location changes of a face of a user. FIG. 1 is a flowchart of the display control method according to the first embodiment of the present disclosure. As shown in FIG. 1, the method includes the following operations S101 to S105:

S101: Consecutively collect face images, and extract face fiducials from the face images.

For ease of description, the face images herein are respectively a first face image and a second face image. The first face image may be a currently collected face image, and the second face image may be a face image adjacent to and collected ahead of the currently collected face image. For example, the first face image may include at least one first face fiducial, and the second face image may include at least one second face fiducial. The fiducials may be extracted from the current face images based on face recognition technologies.

S103: Obtain a face location offset value based on a first face fiducial and a second face fiducial. In this step, it is equivalent to that a location offset of a face fiducial in one face image relative to the face fiducial in an adjacent face image is determined, that is, a location offset of a face fiducial in the current face image (the first face image) relative to the face fiducial in the previous face image (the second face image).

S105: Obtain, based on the face location offset value, a display location offset value of content displayed on a display screen, and perform display control according to the display location offset value. The display location offset value is used for instructing the content currently displayed on the screen or a display interface to be offset in a same direction in which the face fiducial is offset, so that eyes cannot sense wobble of the display content relative to the eyes.

Details of the foregoing operations are specifically described below.

For the collecting face images in step S101, two exemplary manners are provided in the specification. Certainly, the present disclosure is not limited thereto.

Manner 1: The face images are collected within a preset period. The preset period herein may be a time period of a wobble band that is obtained by using a built-in gyroscope. The time period of the wobble band may be a time period in which a user walks one step, or may be a time period of a wobble band during a ride on a vehicle. To avoid misjudgment of a wobble band, two acceleration thresholds may be added for judgment. For example, for a time period in which a user walks one step, an acceleration threshold A and an acceleration threshold B may be preset, A being less than B. Acceleration bands during walking of the user are obtained by using the built-in gyroscope. A terminal device may select duration that corresponds to the following band in the acceleration bands as a time period in which the user walks one step: an acceleration band in which acceleration data is greater than B at first, and acceleration data in the acceleration band starts to be less than A in a subsequent band change process.

Manner 2: The face images are collected at a preset time interval. For example, one piece of face image is collected every 0.05 second, 0.1 second, 0.2 second, 0.5 second, 1 second, or the like. The preset time interval herein may be set according to an actual requirement, and is not specifically limited in the present disclosure.

Obtaining of a Face Location Offset Value:

A face location offset value may refer to an offset value in a plane coordinate system, or may be an offset value in a set spatial coordinate system such as a camera coordinate system. This is not limited in the present disclosure, and is described below with reference to examples. Example 1 is based on a camera coordinate system, and Example 2 is based on a plane coordinate system.

Example 1: Based on a Camera Coordinate System

Figure 2:
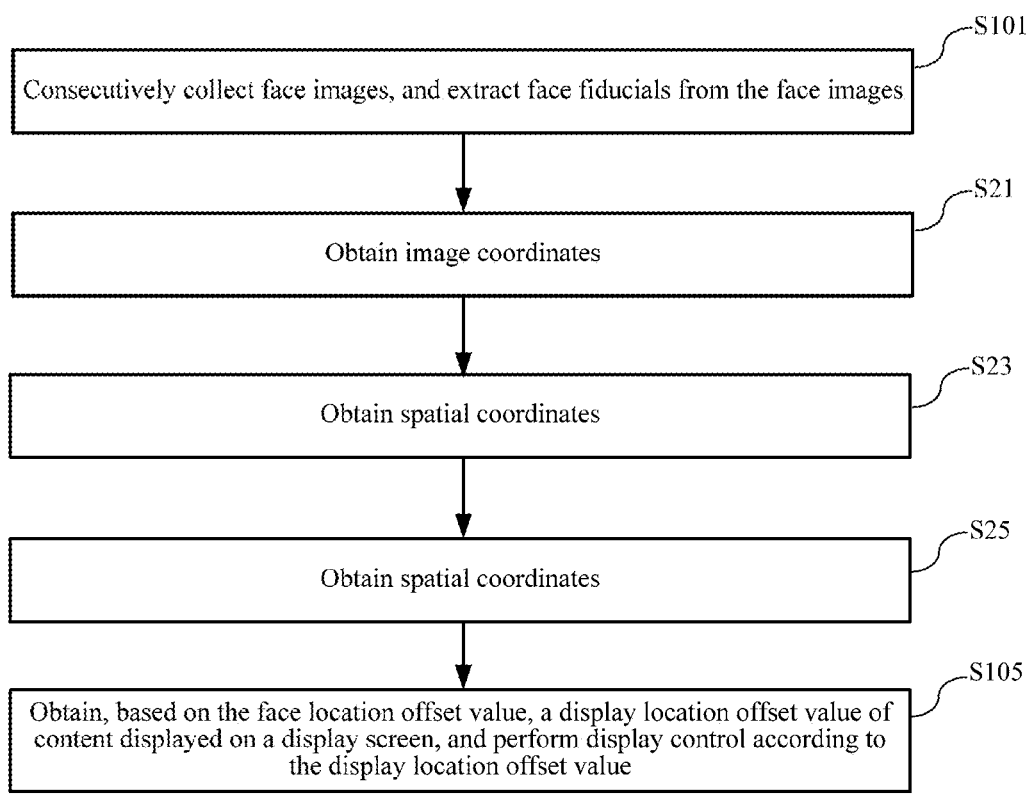
FIG. 2 is a flowchart of Example 1 according to the first embodiment of the present disclosure.

In Example 1, as shown in FIG. 2, the operation of obtaining a face location offset value in step S103 may be implemented by using the following S21 to S25:

S21: Obtain image coordinates, the image coordinates referring to coordinates of the face images in a plane coordinate system and including a first image coordinate that corresponds to the first face fiducial and a second image coordinate that corresponds to the second face fiducial.

S23: Obtain spatial coordinates. Spatial coordinates in a set spatial coordinate system are obtained according to the image coordinates. The spatial coordinates include a first spatial coordinate that corresponds to the first face fiducial and a second spatial coordinate that corresponds to the second face fiducial. For example, the set spatial coordinate system may be a camera coordinate system. The camera coordinate system is preset in a terminal device and uses an optical axis of a camera as an original.

S25: Use a coordinate offset value of the second spatial coordinate relative to the first spatial coordinate as the foregoing face location offset value, so that the operation of obtaining a face location offset value is completed.

Optionally, when obtaining the face location offset value, moving speed information and/or acceleration information of a location offset of the first face fiducial (the current face fiducial) relative to the second face fiducial (the previous face fiducial) may be further obtained according to the time interval at which the face images are collected and the face location offset value. In addition, a display location offset speed may be calculated according to the moving speed information and/or the acceleration information when a display location offset value is calculated subsequently, and display control is performed according to the display location offset speed.

In this example, before the face images are collected, the terminal may obtain external data that is input about lengths between at least two face fiducials. For example, the data about the lengths may be input after the lengths are manually measured by a user. The lengths may include distances between a nose and two eyes and a distance between two eyes.

Based on the above, in this example, spatial coordinates are obtained by using the following operations:

first, obtaining normalized coordinates that correspond to image coordinates in a camera coordinate system; calculating, according to the normalized coordinates, unit vectors between an origin in the camera coordinate system and face fiducials, and obtaining angles between the unit vectors; calculating distances between the origin in the camera coordinate system and the face fiducials according to data that is pre-input about lengths between the face fiducials and the angles between the unit vectors; and calculating, according to the distances between the origin and the face fiducials and the unit vectors, spatial coordinates that correspond to the face fiducials in the camera coordinate system. In this way, the operation of obtaining spatial coordinates is completed.

Figure 3:
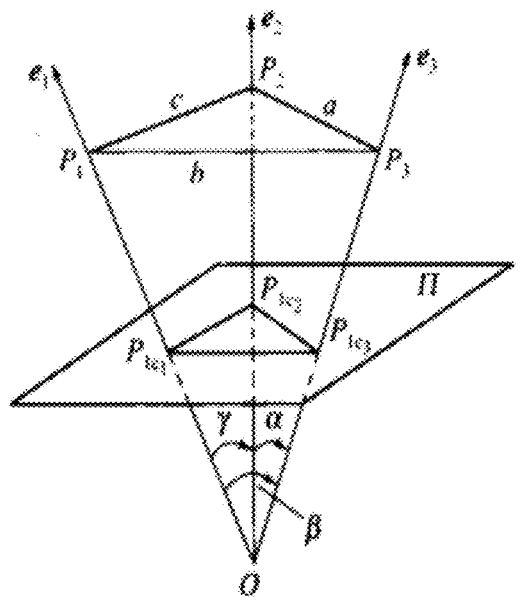
FIG. 3 is a schematic diagram of obtaining a spatial coordinate based on a face fiducial.

FIG. 3 is a schematic diagram of obtaining a spatial coordinate based on a face fiducial. In the FIG. 3 example, two face images are collected and used for description. It is noted that more than two face images can be similarly processed. This is not limited in the present disclosure. It is assumed that each face image includes three face fiducials. Spatial coordinates that correspond to the three face fiducials in a camera coordinate system are respectively $P_1$, $P_2$, and $P_3$. A terminal device may obtain image coordinates that correspond to the face fiducials in each of the two face images by using an image processing technology (that is, the foregoing operation of obtaining image coordinates). The image coordinates are respectively $(u_1, v_1)$, $(u_2, v_2)$, and $(u_3, v_3)$. Then, normalized coordinates $(X_{1c1}, Y_{1c1})$, $(X_{1c2}, Y_{1c2})$, and $(X_{1c3}, Y_{1c3})$ that correspond to the image coordinates in the camera coordinate system may be obtained by using the following normalized formula (that is, the foregoing operation of obtaining normalized coordinates). The normalized formula is:

$$\begin{bmatrix} x_{1c_i} \\ y_{1c_i} \\ 1 \end{bmatrix} = \begin{bmatrix} k_x & 0 & u_0 \\ 0 & k_y & v_0 \\ 0 & 0 & 1 \end{bmatrix}^{-1} \begin{bmatrix} u_i \\ v_i \\ 1 \end{bmatrix}$$

The terminal device may calculate unit vectors between an origin O in the camera coordinate system and the face fiducials by using the foregoing normalized coordinates, that is, a unit vector $e_1$ between the O point and $P_1$, a unit vector $e_2$ between the O point and $P_2$, and a unit vector $e_3$ between the O point and $P_3$. A unit vector calculation formula that is used is:

$$e_i = \frac{1}{\sqrt{x_{1c_i}^2 + y_{1c_i}^2 + 1}} \begin{bmatrix} x_{1c_i} \\ y_{1c_i} \\ 1 \end{bmatrix}$$

The terminal device obtains angles between the unit vectors. An angle between $e_2$ and $e_3$ is denoted as $\alpha$, an angle between $e_1$ and $e_3$ is denoted as $\beta$, and an angle between $e_1$ and $e_2$ is denoted as $\gamma$, so that the following formula is obtained:

$$\begin{cases} \cos \alpha = e_2^T e_3 \\ \cos \beta = e_1^T e_3 \\ \cos \gamma = e_1^T e_2 \end{cases}$$

Then, the terminal device may calculate distances between the origin in the camera coordinate system and the face fiducials according to data about lengths between the face fiducials and the angles between the unit vectors. Assuming that a distance between the O point and $P_1$, a distance between the O point and $P_2$, and a distance between the O point and $P_3$ are respectively $d_1$, $d_2$, and $d_3$, the following formulas are obtained:

$$d_2^2 + d_3^2 - 2d_2 d_3 \cos \alpha = a^2 \qquad (1)$$

$$d_1^2 + d_3^2 - 2d_1 d_3 \cos \beta = b^2 \qquad (2)$$

$$d_1^2 + d_2^2 - 2d_1 d_2 \cos \gamma = c^2 \qquad (3)$$

where a represents data about a length between $P_2$ and $P_3$, b represents data about a length between $P_1$ and $P_3$, and c represents data about a length between $P_1$ and $P_2$.

It is assumed that:

$$\begin{cases} d_2 = x d_1 \\ d_3 = y d_1 \end{cases}$$

The following formula is obtained by substituting the foregoing formula into formula (1), formula (2), and formula (3):

$$d_1^2 = \frac{a^2}{x^2 + y^2 - 2xy\cos\alpha} \qquad (4)$$

$$d_1^2 = \frac{b^2}{1 + y^2 - 2y\cos\beta} \qquad (5)$$

$$d_1^2 = \frac{c^2}{x^2 + 1 - 2x\cos\gamma} \qquad (6)$$

The following formula is obtained by combining formula (4) and formula (5) and eliminating $d_1^2$:

$$x^2 = 2xy\cos\alpha - \frac{2a^2}{b^2} y\cos\beta + \frac{a^2 - b^2}{b^2} y^2 + \frac{a^2}{b^2} \qquad (7)$$

The following formula is obtained by combining formula (5) and formula (6) and eliminating $d_1^2$:

$$x^2 = 2x\cos\gamma - \frac{2c^2}{b^2}y\cos\beta + \frac{c^2}{b^2}y^2 + \frac{c^2 - b^2}{b^2} \quad (8)$$

The following formula is obtained by combining formula (7) and formula (8) and eliminating $x^2$:

$$x = \frac{\frac{a^2 - b^2 - c^2}{b^2}y^2 + 2\cos\beta\frac{a^2 - c^2}{b^2}y + \frac{a^2 + b^2 - c^2}{b^2}}{2(\cos\gamma - y\cos\alpha)} \quad (9)$$

The following formula is obtained by substituting formula (9) into formula (7):

$$a_4 y^4 + a_3 y^3 + a_2 y^2 + a_1 y + a_0 = 0 \quad (10)$$

where $$a_0 = \left(\frac{a^2 + b^2 - c^2}{b^2}\right)^2 - \frac{4a^2}{b^2}\cos^2\gamma$$

$$a_1 = 4\left[-\left(\frac{a^2 + b^2 - c^2}{b^2}\right)\left(\frac{a^2 - c^2}{b^2}\right)\cos\beta + \right.$$
$$\left. \frac{2a^2}{b^2}\cos^2\gamma\cos\beta + \left(\frac{a^2 - b^2 + c^2}{b^2}\cos\alpha\cos\gamma\right)\right]$$

$$a_2 = 2\left[\left(\frac{a^2 - c^2}{b^2}\right)^2 - 1 - 4\left(\frac{a^2 + c^2}{b^2}\right)\cos\alpha\cos\beta\cos\gamma + \right.$$
$$\left. 2\left(\frac{b^2 - c^2}{b^2}\right)\cos^2\alpha + 2\left(\frac{a^2 - c^2}{b^2}\right)^2\cos^2\beta + 2\left(\frac{b^2 - a^2}{b^2}\right)\cos^2\gamma\right]$$

$$a_3 = 4\left[-\left(\frac{a^2 - b^2 - c^2}{b^2}\right)\left(\frac{a^2 - c^2}{b^2}\right)\cos\beta + \frac{2c^2}{b^2}\cos^2\alpha\cos\beta + \right.$$
$$\left. \left(\frac{a^2 - b^2 + c^2}{b^2}\right)\cos\alpha\cos\gamma\right]$$

$$a_4 = \left(\frac{a^2 - b^2 - c^2}{b^2}\right) - \frac{4c^2}{b^2}\cos^2\alpha$$

A value of y may be calculated by using formula (10), a value of x may be obtained by substituting the value of y into formula (9), and a value of $d_1$ may be calculated by using formula (4), formula (5) and formula (6). In this way, a value of $d_2$ and a value of $d_3$ may be calculated.

Then, the terminal device may determine the spatial coordinates that correspond to the face fiducials in the camera coordinate system according to the distances between the origin and the face fiducials and the calculated unit vectors. The spatial coordinates may be calculated by using the following coordinate calculation formula:

$$P_i = d_i \times e_i \ (i=1,2,3)$$

In this way, calculation of the spatial coordinates is completed. Then, a coordinate offset value between a first spatial coordinate and a second spatial coordinate that are obtained through calculation is calculated based on the first spatial coordinate and the second spatial coordinate, and the coordinate offset value is used as a face location offset value. Further, a display location offset value according to which adjustment and control is performed on display content on a screen of the terminal is obtained for performing display control.

Example 2: Plane Coordinate System

Figure 4A:
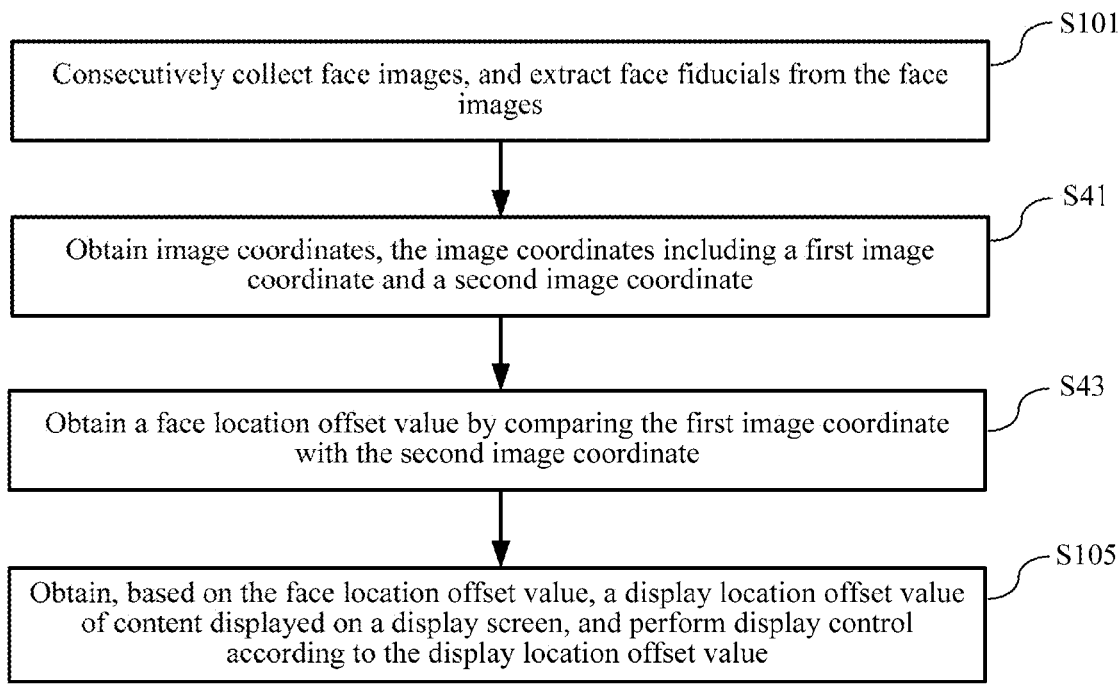
FIG. 4A is a flowchart of Example 2 according to the first embodiment of the present disclosure.

In Example 2, as shown in FIG. 4A, the operation of obtaining a face location offset value in step S103 may be implemented by using the following S41 to S43:

S41 (the same as S21): Obtain image coordinates, the image coordinates referring to coordinates of face images in a plane coordinate system and including a first image coordinate (a current location) that corresponds to a first face fiducial and a second image coordinate (a previous location) that corresponds to a second face fiducial.

In an optional manner, the obtained image coordinates may be stored in a memory, so that whether a face is offset may be determined by comparing the first image coordinate with the second image coordinate. Specifically, if the first image coordinate and the second image coordinate are the same, it indicates that the face is not offset. If the first image coordinate and the second image coordinate are different, it indicates that the face is offset.

In another optional manner, the currently obtained image coordinate may be stored when the two image coordinates that are obtained sequentially are different. In this way, during implementation, whether a first image coordinate (a previous location) of a face fiducial is stored can be determined first. If the first image coordinate is stored, it indicates that a current face image is not the first piece of face image, but that a face image has been previously collected. That is, a face is moved, and the following steps may be continued to be performed. If the first image coordinate does not exist, it indicates that the face is not offset, and that the following operations do not need to be performed. When the precious location of the face fiducial in the coordinate system is stored:

S43: Use a coordinate change of the second image coordinate relative to the first image coordinate as the face location offset value by comparing the first image coordinate with the second image coordinate.

The face location offset magnitude may be represented by using a difference between the second image coordinate and the first image coordinate. During specific implementation, adjustment and control may be performed on real-time display according to any offset of the face fiducial. Alternatively, adjustment and control may not be performed when the fiducial is slightly offset. In this case, an offset threshold may be set, and display adjustment and control is not performed unless the face location offset value is greater than the offset threshold.

For example, the face location offset value includes at least one of the following: an X coordinate offset value, a Y coordinate offset value, or a distance offset value. Correspondingly, the preset threshold includes at least one of the following: an X coordinate offset threshold, a Y coordinate offset threshold, or a distance offset threshold.

Specifically, in an implementation, the face location offset value includes: the X coordinate offset value, the Y coordinate offset value, and the distance offset value. Further, it may be determined whether the X coordinate offset value is greater than the preset X coordinate offset threshold, whether the Y coordinate offset value is greater than the preset Y coordinate offset threshold, and whether the distance offset value is greater than the preset distance offset threshold. If any one of the three determining results is yes, the subsequent operation of obtaining a display location offset value is performed.

In another implementation, the face location offset value includes the X coordinate offset value and the Y coordinate offset value. In this step, correspondingly, it may be determined whether the X coordinate offset value is greater than the preset X coordinate offset threshold, and whether the Y coordinate offset value is greater than the preset Y coordinate offset threshold. If any one of the two determining results is yes, the subsequent operation of obtaining a display location offset value is performed.

In still another implementation, the face location offset value includes the X coordinate offset value or the Y coordinate offset value. In this case, it may be determined whether the X coordinate offset value is greater than the preset X coordinate offset threshold, or whether the Y coordinate offset value is greater than the preset Y coordinate offset threshold. If the determining result is yes, the subsequent operation of obtaining a display location offset value is performed.

It is noted that, the foregoing operation of determining whether to perform display adjustment and control according to an offset threshold is also applicable to Example 1, and details are not described herein again.

Obtaining of a Display Location Offset Value:

Three manners in which a display location offset value is obtained are provided below by way of example, and are respectively described. It can be learned from the following description that, in this embodiment of the present disclosure, the face location offset value may be equal to or be unequal to the display location offset value. This is not limited in the present disclosure.

Manner 1: The display location offset value is obtained according to the face location offset value, and adjustment and control on display content is directly performed according to the display location offset value. Using the operation in Example 1 as an example, for example, if the coordinate offset value refers to that the second spatial coordinate is translated in a positive direction of an X axis for 3 mm relative to the first spatial coordinate, the display content on the screen is translated in the positive direction of the X axis for 3 mm. Likewise, in a Z axis direction, if the coordinate offset value refers to that the second spatial coordinate moves in a positive direction of a Y axis for 3 mm relative to the first spatial coordinate, a dimension of the display content on the screen may be zoomed out correspondingly, or the like.

Manner 2: The display location offset value may be obtained when it is determined that the face location offset value is greater than a preset offset threshold, and then display control is performed. Refer to the description in Example 2 for details.

Manner 3: A maximum allowable offset value may be set. In an implementation, the set maximum allowable offset value refers to an offset value that does not affect relative integrity of display content presentation. That is, the offset magnitude allows a part of the display content not to be presented while the non-integrated presentation does not affect a thorough understanding of the display content. In another implementation, an offset cache is set on a periphery of the display screen. A content display interface does not cover the entire display screen. During normal display, the content display interface is centered on the display screen, and the offset cache is set on the content display interface. When wobble occurs subsequently, the content display interface may be offset in the offset cache, and an offset distance that corresponds to a maximum boundary location of the offset cache is the maximum allowable offset value.

Specifically, when the face location offset value is greater than the preset offset threshold, the display location offset value may be further determined according to the face location offset value and the preset maximum allowable offset value. The maximum allowable offset value herein may include a maximum offset value in an X axis direction and a maximum offset value in a Y axis direction.

An example in which the display content is video content is used for description. In this case, the maximum offset value in the X axis direction may be set to be DxMax=DeviceWidth×0.2, and the maximum offset value in the Y axis direction may be set to be DyMax=DeviceHeight×0.1. Further, for example, for text content, the maximum offset value in the X axis direction may be set to be DxMax=DeviceWidth×0.05, and the maximum offset value in the Y axis direction may be set to be DyMax=DeviceHeight×0.02, DeviceWidth being a width of the terminal device, and DeviceHeight being a height of the terminal device.

Using the operation in Example 2 as an example, the one having a smaller absolute value between the X coordinate offset value and the maximum offset value in the X axis direction may be used as the display location offset value in the X axis direction; and/or the one having a smaller absolute value between the Y coordinate offset value and the maximum offset value in the Y axis direction may be used as the display location offset value in the Y axis direction. The objective is to convert an excessive offset value of the user to a reasonable value, so that relatively integrated display content may be viewed after the reasonable offset value is adjusted to.

A vector direction of the display location offset value is the same as a vector direction of the face location offset value.

For example, the display location offset value may be determined according to the following formula (11):

$$Dx2=(Dx1<0?-1:1)\times \text{Min}(\text{abs}(Dx1),Dx\text{Max});$$

$$Dy2=(Dy1<0?-1:1)\times \text{Min}(\text{abs}(Dy1),Dy\text{Max}) \quad (11)$$

where Dx1 and Dy1 are respectively the face location offset values calculated in step S4, that is, the X coordinate offset value and the Y coordinate offset value, and Dx2 and Dy2 are respectively the display location offset values calculated in the current operation, that is, the X coordinate display location offset value and the Y coordinated display location offset value.

Display Control

After the display location offset value is obtained, the content displayed on the screen of the terminal or the interface on which the display content is located is offset according to the display location offset value in a same direction in which the face fiducials are offset. During specific implementation, the offset may be implemented by using a media player such as an improved video player or an ebook reader.

If the foregoing display location offset value is a vector value, the display content or the display interface is controlled to be offset according to the vector display location offset value. Alternatively, if an absolute value of the display location offset value is obtained, the display content or the display interface is controlled to be offset according to the display location offset value in the same direction in which the face location offset value is offset.

In this embodiment, when display control is performed, both the adjustment and control on the display content or the display interface according to the display location offset value and the adjusting the display interface that is in an offset state to be centered may be performed at a specified speed. Optionally, when the face location offset speed/acceleration is calculated above, and the display location offset speed/acceleration is calculated according to the face location offset speed/acceleration, display control may be performed, according to the display location offset speed/acceleration, on the content displayed on the screen of the terminal or the interface on which the display content is located. That is, the display location offset speed may be adaptive to the face fiducial location offset speed of the user (that is, the foregoing face location offset speed). A principle of the display location offset speed is trying not to let the user sense wobble. For example, when the content display interface that is in the offset state is adjusted to be centered, because the user is basically in a steady state, an adjustment and control speed that cannot be easily sensed by the user may be used.

During specific implementation, if the user remains steady relative to the terminal device, and duration of the steadiness exceeds a set threshold, for example, 0.5 second, 1 second, or 2 seconds, it may be considered that the user is in a steady state. Correspondingly, the display content may be normally presented. For example, if the display interface of the content is in an offset display state, the display interface is adjusted to be centered. If the display interface is normally presented, the normal presentation is maintained. Specifically, in this embodiment, when it is determined above that the face location offset value is not greater than the preset offset threshold, it is determined whether there is a timer that is timing currently. If there is a timer that is timing currently, it is determined whether a timing time of the timer reaches a set timing threshold. If the timing time of the timer reaches the set timing threshold, timing of the timer is stopped, and display of the display interface is controlled to be reset, that is, the display interface is displayed in a normal manner (which is usually to be displayed in a centered manner) in which the display content is displayed. If there is no timer that is timing currently, a timer is activated to time.

In addition, the results of adjusting and controlling the display content on the screen may be periodically invoked and displayed on the screen of the terminal. Using an example in which the user walks, because a process of wobble during the walking is relatively regular, energy consumption of the device is reduced. The terminal device may perform display control by using the foregoing method at a time interval (for example. at a specified period), to display the display content on the screen. That is, in an example, the terminal device only needs to complete collecting face images, calculating spatial coordinates, adjusting display content, and recording an adjustment result of adjusting the display content within one time period, and may then display the display content on the screen within each subsequent time period by using the adjustment result. Certainly, to further ensure accuracy of adjusting and controlling the display content based on reducing the energy consumption of the device, the terminal device may also perform the process of the foregoing method every preset quantity of time periods.

The display control flow according to the first embodiment of the present disclosure is further described below by using the solution that is described in Example 2 and that is of obtaining a display location offset value based on a plane coordinate system, and with reference to a flowchart of FIG. 4B.

Figure 4B:
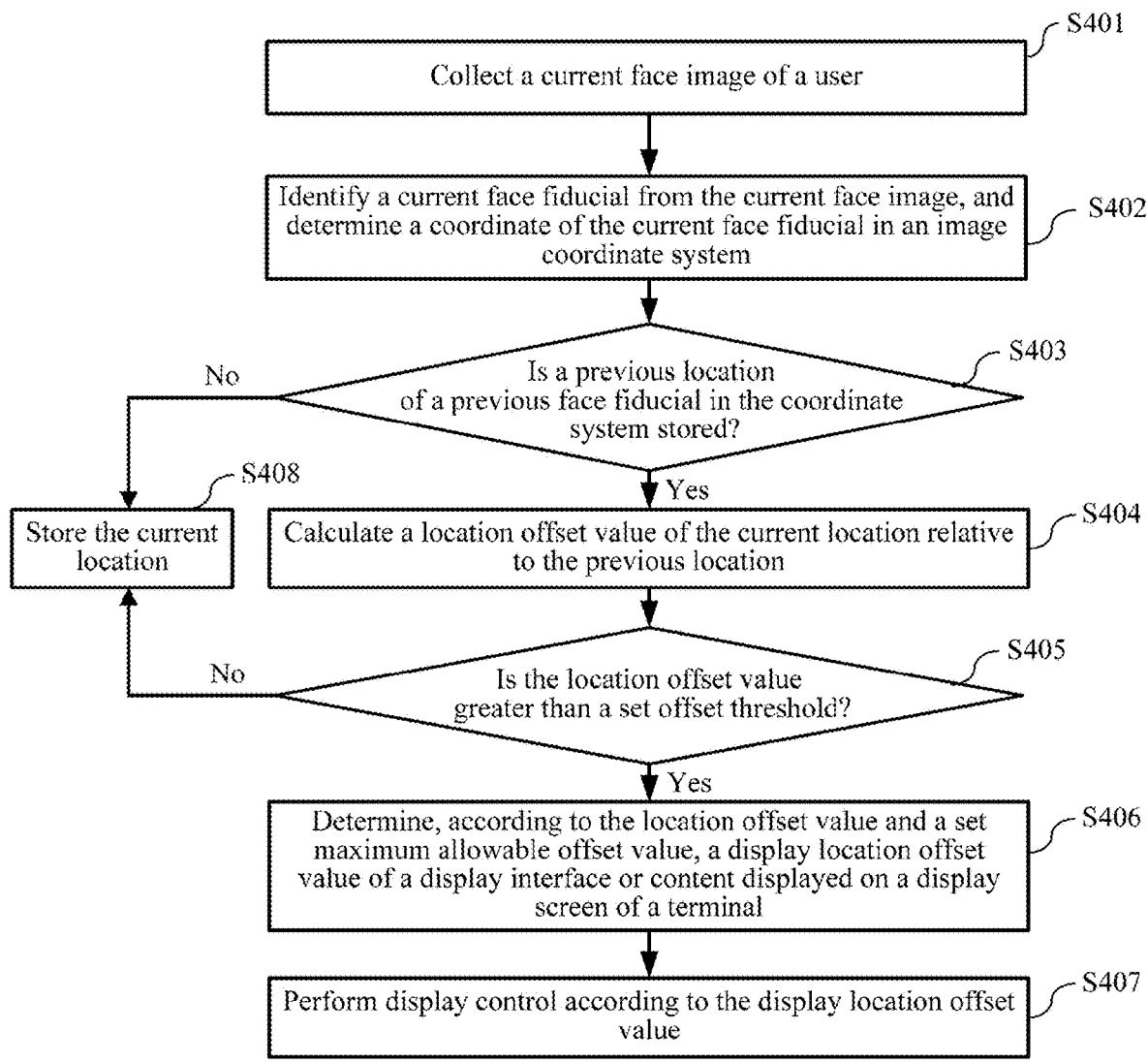
FIG. 4B is a schematic flowchart of a display control method according to the first embodiment of the present disclosure.

As shown in FIG. 4B, first, a current face image of a user is collected by using a camera (S401); a face fiducial is extracted from the current face image, and an image coordinate of the face fiducial in an image coordinate system is determined (S402); then, it is determined whether an image coordinate of a face image, that is previously collected, in the image coordinate system is stored in a memory, that is, a location of the face image that is previously collected (S403); if the image coordinate of the face image, that is previously collected, in the image coordinate system is not stored, it indicates that a face location is not offset, so that the image coordinate of the face fiducial of the current face image is stored (S408); if the image coordinate of the face image, that is previously collected, in the image coordinate system is stored, it indicates that the face location is offset, and in this case, a face location offset value of the current face image relative to the face image that is previously collected is calculated (S404); the face location offset value is compared with a preset threshold (S405); the subsequent operation of display control is performed when it is determined that the face location offset value is greater than the preset threshold, that is, a display location offset value according to which display content is moved on a display screen is determined according to the face location offset value and a preset maximum allowable offset value (S406); and display control is performed on the currently displayed content according to the calculated display location offset value (S407).

Figure 5A:
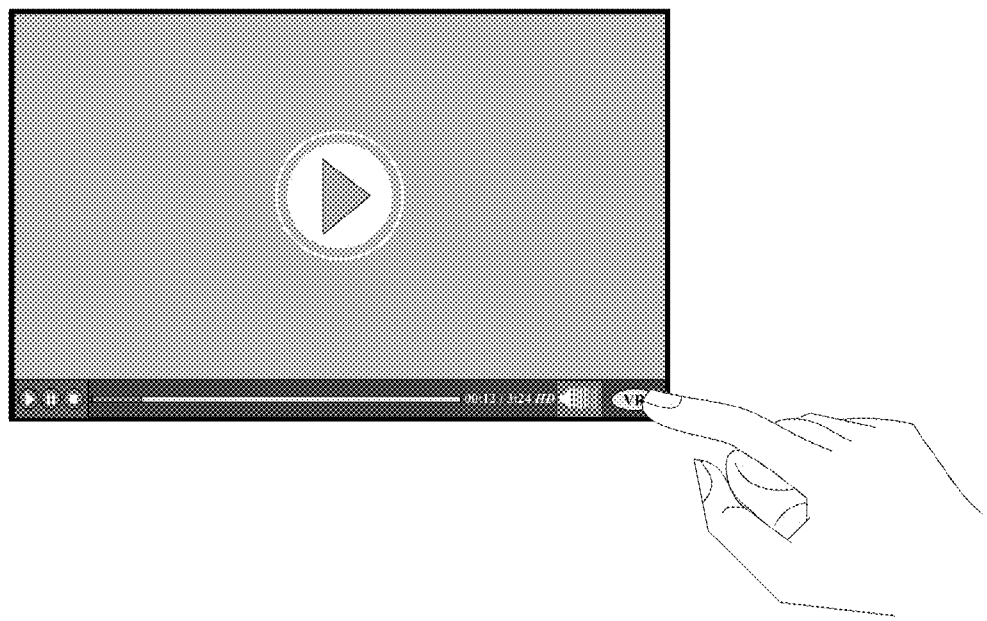
FIG. 5A to FIG. 5C are a schematic diagram of an application scenario of a display control method according to an embodiment of the present disclosure.
Figure 5B:
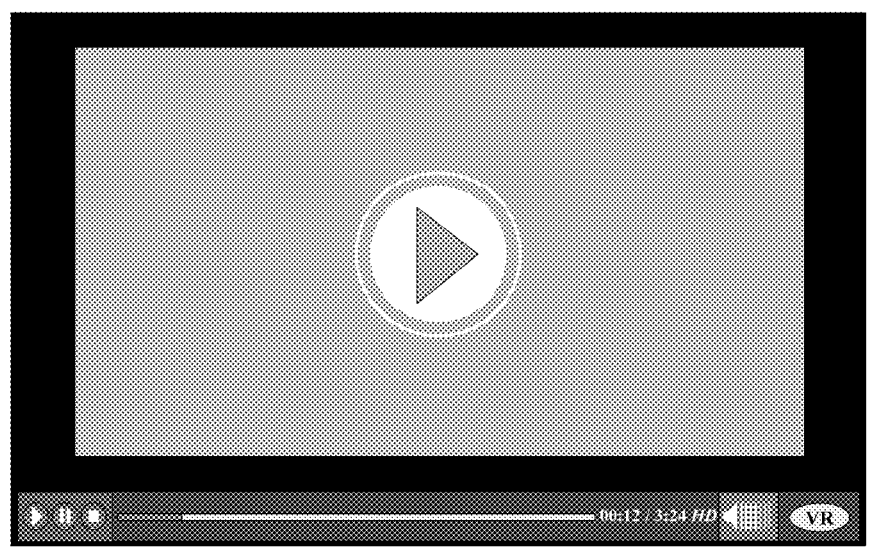
Figure 5C:
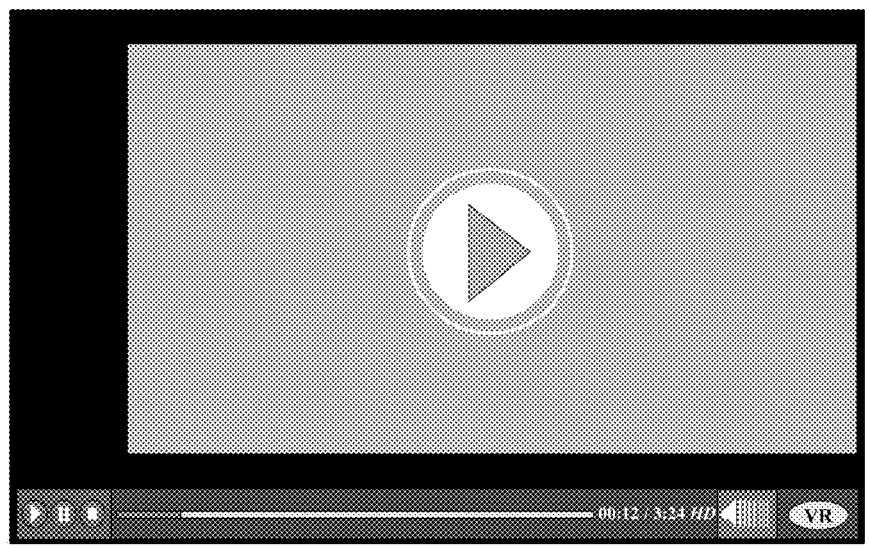

For ease of understanding the foregoing operations, FIG. 5A to FIG. 5C show an application scenario of an embodiment of the present disclosure. As shown in FIG. 5A, an anti-wobble function button is set on a display interface of a mobile terminal (such as an iPad), that is, a "VR" button in FIG. 5A. When a user clicks the "VR" button, the system enters an anti-wobble state, and the display interface may be zoomed out to a preset dimension, so that it is easy to leave a preset offset cache on a periphery, as shown in FIG. 5B. When it is detected that a face fiducial of the user is offset, the display interface is controlled to be offset correspondingly, as shown in FIG. 5C.

Second Embodiment

Figure 6:
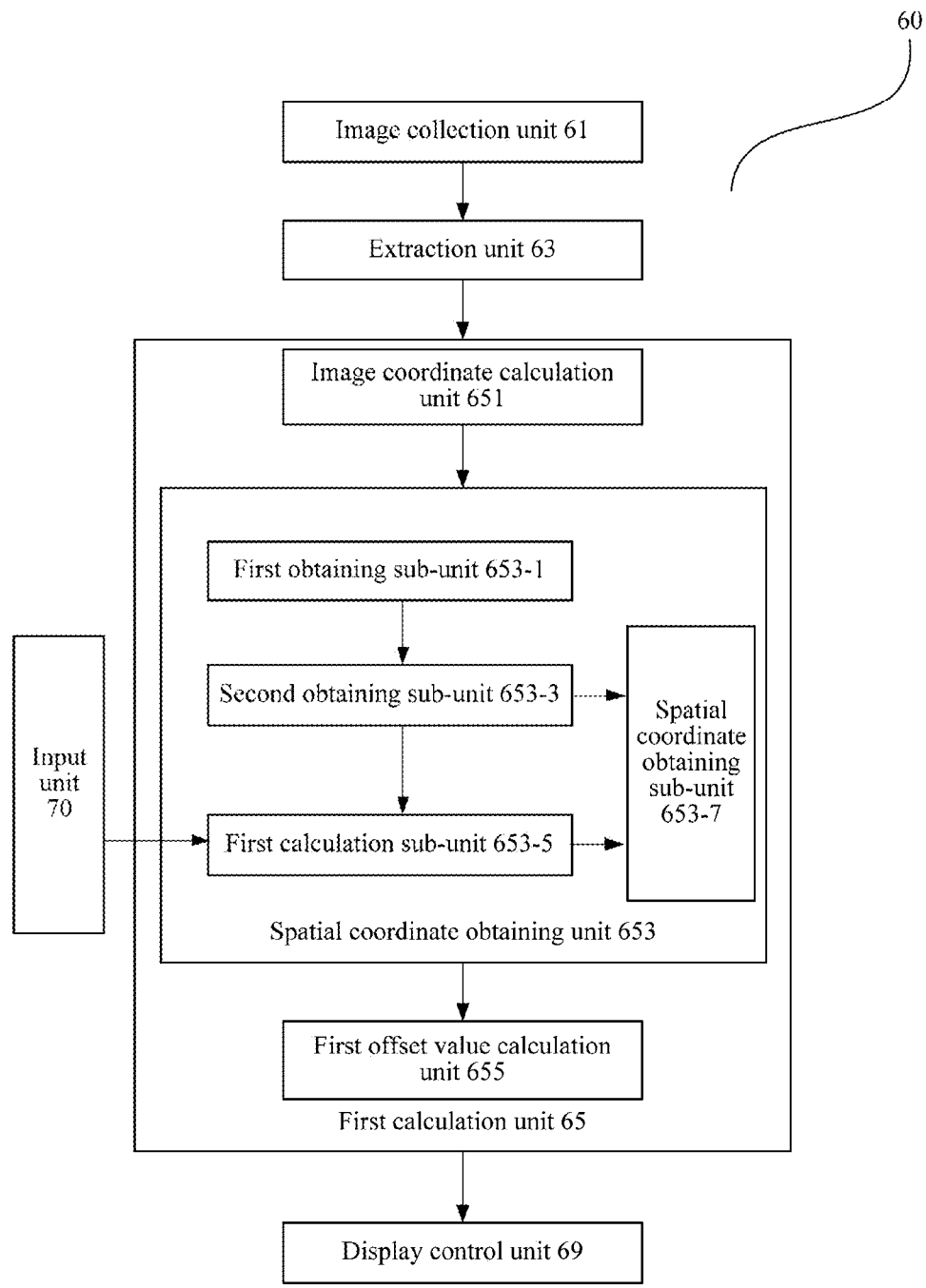
FIG. 6 is a structural block diagram of a display control apparatus according to an example of a second embodiment of the present disclosure.

According to this embodiment of the present disclosure, a display control apparatus is provided. The apparatus may be used for implementing the display control method according to the first embodiment. FIG. 6 is a block diagram of a display control apparatus according to the second embodiment of the present disclosure. As shown in FIG. 6, the display control apparatus 60 includes an image collection unit 61 (such as a camera), an extraction unit 63 (such as a processor), a first calculation unit 65 (such as a calculator), a second calculation unit 67 (such as a calculator), and a display control unit 69 (such as a controller). Optionally, the apparatus may further include a storage unit that is configured to store relevant data (not shown, such as a memory).

Specifically, the image collection unit 61 is configured to consecutively collect face images that include face fiducials. The face images include a first face image and a second face image. The extraction unit 63 is configured to extract face fiducials from the face images that are collected by the image collection unit 61. The face fiducials include a first face fiducial that is included in the first face image and a second face fiducial that is included in the second face image. The first calculation unit 65 is configured to calculate a face location offset value according to the face fiducials that are extracted by the extraction unit 63. The second calculation unit 67 is configured to calculate a display location offset value of content displayed on a display screen according to the face location offset value that is calculated by the first calculation unit 65. The display control unit 69 is configured to perform display control according to the display location offset value that is calculated by the second calculation unit 67.

Further, as shown in FIG. 6, in an example, the first calculation unit 65 may have the following structure. The structure is mainly applicable to calculating a face location offset value in a spatial coordinate system. The structure includes: an image coordinate calculation unit 651, configured to obtain image coordinates, the image coordinates including a first image coordinate that corresponds to the first face fiducial and a second image coordinate that corresponds to the second face fiducial; a spatial coordinate obtaining unit 653, configured to obtain spatial coordinates in a camera coordinate system according to the image coordinates that are obtained by the image coordinate calculation unit 651, the spatial coordinates including a first spatial coordinate that corresponds to the first face fiducial and a second spatial coordinate that corresponds to the second face fiducial; a first offset value calculation unit 655, configured to: calculate a coordinate offset value of the second spatial coordinate relative to the first spatial coordinate, and use the coordinate offset value as the face location offset value.

In an example, the spatial coordinate obtaining unit 653 may have the following structure. The structure includes: a first obtaining sub-unit 653-1, configured to obtain normalized coordinates that are in a camera coordinate system and that correspond to the image coordinates that correspond to the face fiducials; a second obtaining sub-unit 653-3, configured to calculate, according to the normalized coordinates that are obtained by the first obtaining sub-unit 653-1, unit vectors between an origin in the camera coordinate system and the face fiducials, and obtain angles between the unit vectors; a first calculation sub-unit 653-5, configured to calculate distances between the origin in the camera coordinate system and the face characteristic points (face fiducials) according to data that is pre-input by an input unit 70 about lengths between the face characteristic points and the angles between the unit vectors that are calculated by the second obtaining sub-unit 653-3; and a spatial coordinate obtaining sub-unit 653-7, configured to determine, according to the distances that are between the face characteristic points and the origin and that are calculated by the first calculation sub-unit 653-5 and the unit vectors obtained by the second obtaining sub-unit 653-3, the spatial coordinates that correspond to the face fiducials in the camera coordinate system.

Figure 7:
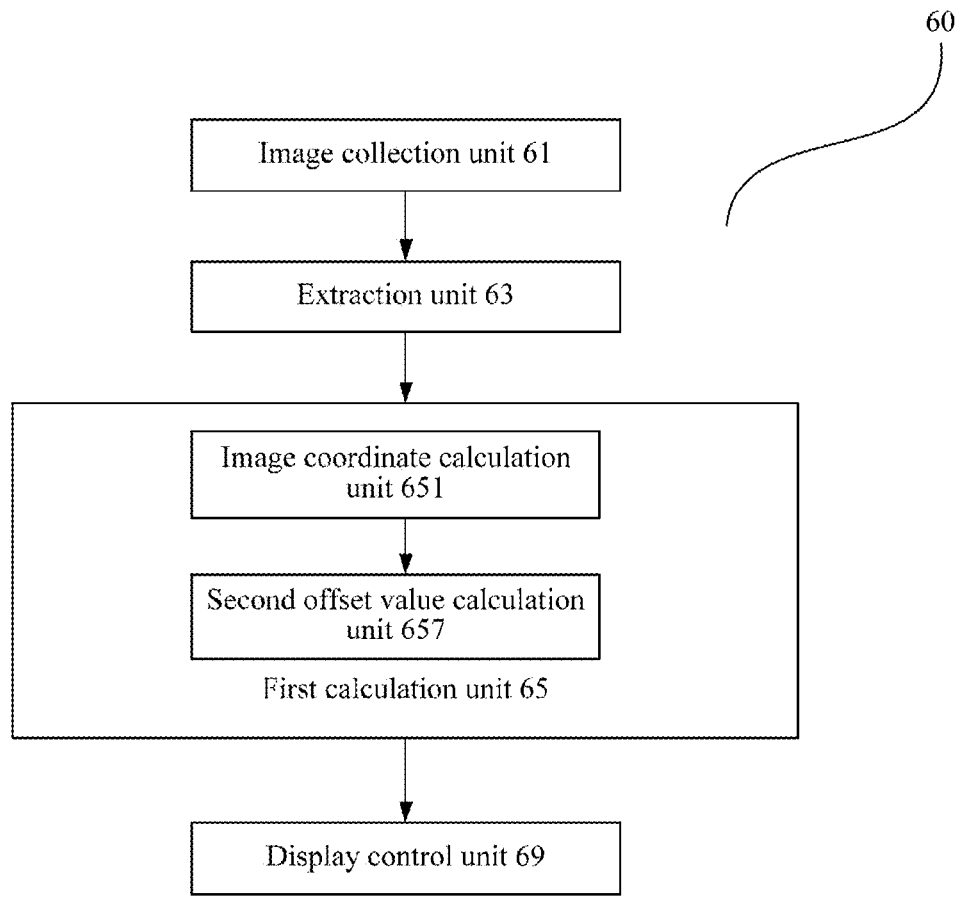
FIG. 7 is a structural block diagram of a display control apparatus according to another example of the second embodiment of the present disclosure.

FIG. 7 is a structural block diagram according to another example of this embodiment. The structure shown in FIG. 7 is different from the structure shown in FIG. 6 mainly in that the first calculation unit 65 may have a structure that is mainly applicable to calculating a face location offset value in a plane coordinate system. As shown in FIG. 7, the structure includes: an image coordinate calculation unit 651, configured to obtain image coordinates, the image coordinates including: a first image coordinate that corresponds to a first face fiducial in a face image and a second image coordinate that corresponds to a second face fiducial in a face image; and a second offset value calculation unit 657, configured to: calculate a coordinate offset value of the second image coordinate relative to the first image coordinate, and use the calculated coordinate offset value as the face location offset value.

Refer to the first embodiment for understanding and implementing operation details of each component in the second embodiment. Features of the first embodiment and features of the second embodiment may be combined when no conflicts occur. Details are not described herein to avoid unnecessarily obscuring the present disclosure.

The foregoing describes the embodiments in which display on a display screen is adjusted and controlled based on an offset or a coordinate change of a face. The disclosure is not limited thereto. The disclosure further provides another solution in which display control is performed according to a location change of a terminal. Compared with the first embodiment and the second embodiment, in this solution, display control is performed according to an offset or a location change of a terminal. During specific implementation, a manner in which display control is performed, that is, whether to perform display control according to a location change of a terminal or according to a location change of a face of a user may be determined based on hardware capacity of the terminal, for example, whether the terminal is capable of obtaining a user reference object (that is, a characteristic point such as an eye, a nose, or a location between the eyebrows). Details are described below with reference to embodiments.

Third Embodiment

First, a terminal used for implementing this embodiment and a fourth embodiment below may be pre-configured with an anti-wobble function at delivery. The anti-wobble function may be enabled or disabled according to an instruction entered by a user and according to an actual need, or may be enabled by default in a normal state, and the default enabling may be implemented by using configuration setting information that is in a configuration table.

Figure 8:
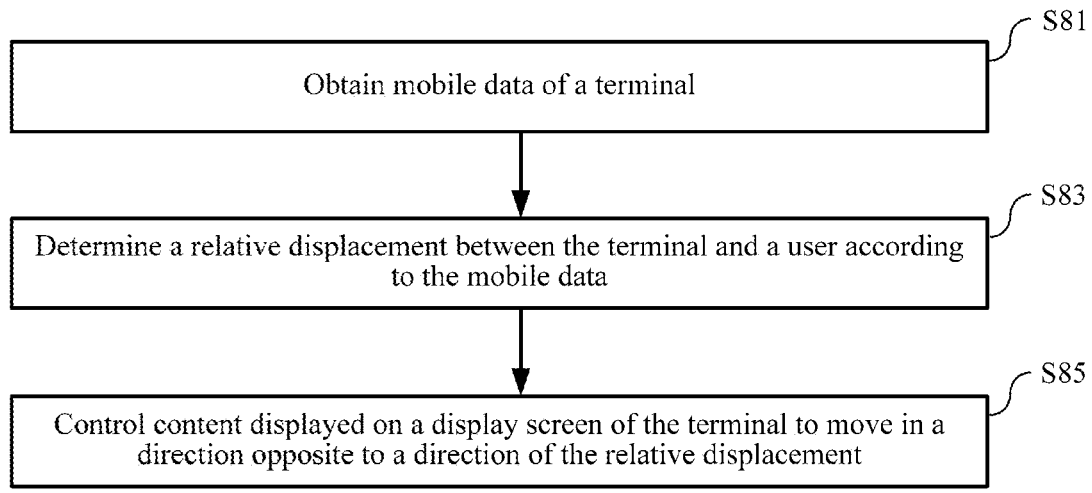
FIG. 8 is a flowchart of a display control method according to a third embodiment of the present disclosure.

According to the third embodiment of the present disclosure, a display control method is provided. FIG. 8 is a flowchart of the method. As shown in FIG. 8, the method includes the following operations S81 to S83. Specifically:

S81: Obtain mobile data (a moving parameter) of a terminal.

S83: Determine a relative displacement between the terminal and a user according to the mobile data.

S85: Control content displayed on a display screen of the terminal to move in a direction opposite to a direction of the relative displacement.

Details of the foregoing operations are described below.

Obtaining of Mobile Data

The mobile data refers to a moving parameter of the terminal, and indicates a current moving state or a moving state within a previous time period. For example, the mobile data may be a moving parameter such as an initial speed, an acceleration, a rotation speed, or a rotation acceleration. Alternatively, the mobile data may be a parameter that indicates that the terminal is moved, such as a change of an angle or a change of a distance between the terminal and a reference object. The mobile data may be any parameter that is used for calculating a relative displacement between the terminal and the user. This is not limited in the present disclosure. In an example, this operation may at least be implemented in the following two manners:

Manner 1: An acceleration of the terminal in a direction of the screen is obtained, or the acceleration of the terminal in the direction of the screen and a rotation angle in the direction of the screen are obtained. In this way, a displacement value of the terminal can be directly calculated.

Manner 2: A change value of an angle between a connection line that is between the screen of the terminal and a reference location of the user and the screen of the terminal is calculated. By means of this manner, a reference parameter may be obtained, and the reference parameter is used as a basis of adjusting the relative displacement subsequently.

Determining of a Relative Displacement

A displacement of the terminal in the direction of the screen is calculated according to the obtained acceleration of the terminal, and the displacement is used as the relative displacement between the terminal and the user. Alternatively, a displacement of the terminal in the direction of the screen is calculated according to the obtained acceleration and rotation angle, and the displacement is used as the relative displacement between the terminal and the user.

It may be understood that if a change value of the angle is used as the mobile data of the terminal, a greater change value of the angle indicates a greater relative displacement.

Display Control

When display adjustment and control is performed, in an implementation, a display location offset value, that is, an offset value of an image that is display on the display screen of the terminal may be further calculated. Specifically, the display location offset value may be calculated according to the foregoing relative displacement. A direction of the display location offset value is opposite to a direction of the relative displacement. Because the terminal may have heavy wobble, wobble or shake may sometimes not be completely counterbalanced by moving the content on the screen. However, impact of the wobble can at least be reduced in this manner.

In an implementation, a preset threshold may be set, and how to perform display control may be determined according to a magnitude relation between the relative displacement and the threshold.

Specifically, if the relative displacement is greater that the preset threshold, the display location offset value is smaller the relative displacement, that is, a ratio of the display location offset value to the relative displacement is less than 1.

The following further describes, by using an example, the operations of the display control method according to the third embodiment of the present disclosure. In the example, a mobile phone is used as an example. The mobile phone is set with an accelerometer and a gyroscope. The accelerometer and the gyroscope are used for collecting wobble data of the mobile phone. A moving distance of the mobile phone in a direction of a screen is calculated according to the data, so that display on the screen of the mobile phone is controlled, and content (such as characters) displayed on the mobile phone is moved in a direction opposite to a moving direction of the mobile phone. For the user, although the mobile phone is wobbling, the characters on the screen are stationary relative, so that it is easier to view the content on the screen clearly.

EXAMPLE

Figure 9:
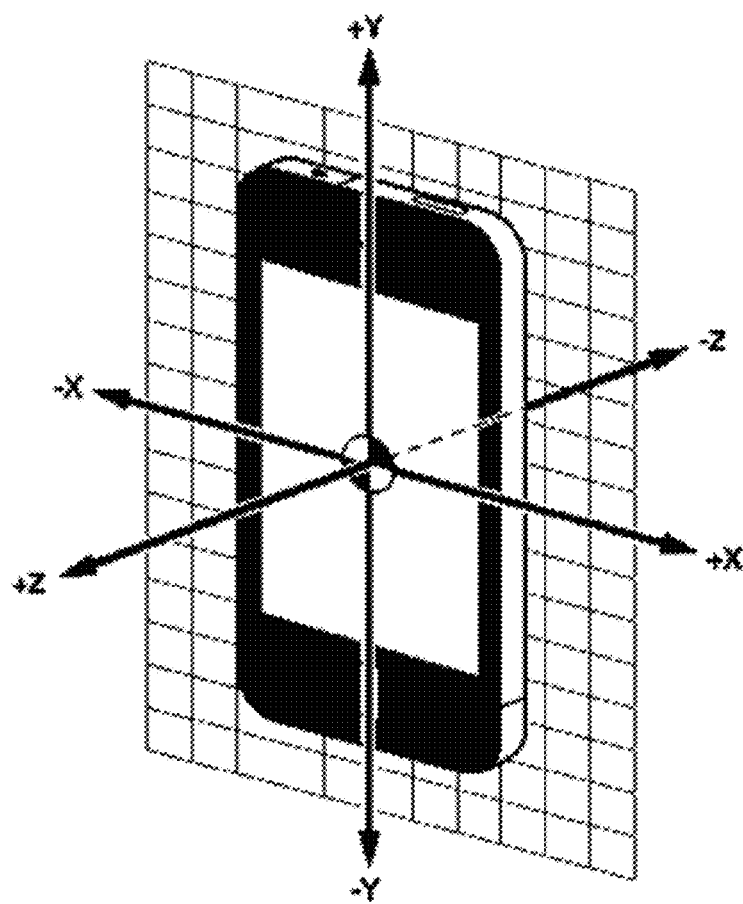
FIG. 9 is a schematic diagram of a display control method according to the third embodiment of the present disclosure.

First, as shown in FIG. 9, FIG. 9 shows an X axis, a Y axis, and a Z axis. The Z axis is a distance between the terminal and the user. An acceleration of the terminal (the mobile phone) on the X axis and an acceleration on the Y axis in the direction of the screen (in the plane of the screen) are collected by using the accelerometer. A time interval for collection is t.

A displacement formula, $s=v_0 t+at^2$, is used, where s=displacement, $v_0$=initial speed, a=acceleration, and t=time.

A displacement on the X axis and a displacement on the Y axis are calculated and are respectively denoted as Sx and Sy.

A rotation angle on the X axis, a rotation angle on the Y axis, and a rotation angle on the Z axis are calculated by using the gyroscope and are respectively denoted as Rx, Ry, and Rz.

Then, the foregoing original data that are collected are converted to pixel data. It is assumed that a screen of the mobile phone has a width, w and a height, h, and resolutions are Pw, Ph. The operation may be implemented by setting a conversion module such as a calculator.

$Psw=(Pw/w) \times Sx$, where Psw is a quantity of pixels of the displacement in the X axis direction.

$Psh=(Ph/h) \times Sy$, where Psh is a quantity of pixels of the displacement in the Y axis direction.

Then, adjustment and control is performed on the display content according to the calculate Psw and Psh. Specifically, three-dimensional rotation is performed on the content on the screen within a specified range according to the rotation angles Rx, Ry, and Rz that are collected by the gyroscope, so that the displacement of the device is neutralized and counterbalanced. The operation may be implemented by setting a conversion module such as a controller.

As described above, in this embodiment, mobile data of a terminal is obtained, and a relative displacement between the mobile terminal and a user is further determined based on the mobile data, and display of display content (such as an image) on a display screen is adjusted. In this way, the image is caused to move in a direction opposite to a direction of the relative displacement, so that vibration or wobble of the terminal is counterbalanced. For the user, wobble of the display content of the terminal may be visually reduced, so that the user can browse relatively clear display content and user experience is improved.

Figure 10:
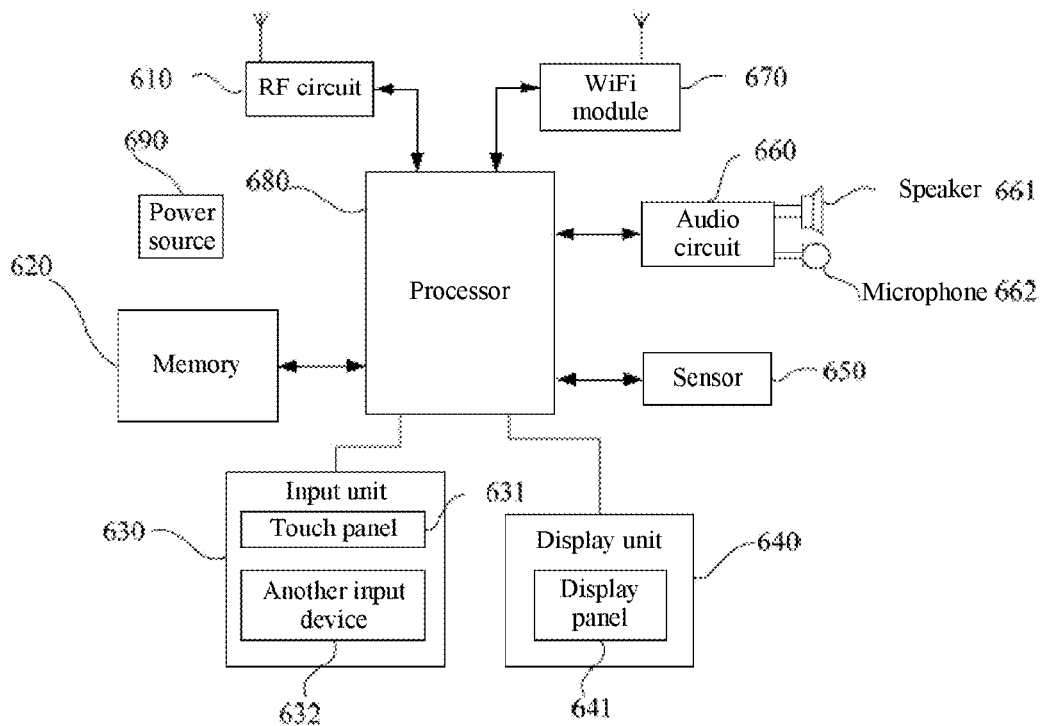
FIG. 10 is a schematic diagram of an architecture of a mobile phone according to an embodiment of the present disclosure.

For ease of understanding, further, an exemplary architecture of the mobile phone used in this embodiment of the present disclosure is shown. Refer to FIG. 10 for details. The architecture may also be applicable to the first embodiment and the second embodiment. The architecture of the mobile phone shown in FIG. 10 is merely an example, and is used for ease of understanding this embodiment of the present disclosure, but is not intended to constitute any type of limitation.

As shown in FIG. 10, the mobile phone includes components such as a radio frequency (Radio Frequency, RF) circuit 610, a memory 620, an input unit 630, a display unit 640, a sensor 650, an audio circuit 660, a WiFi module 670, a processor 680, and a power source 690.

The RF circuit 610 is configured to receive and send information or receive and send a signal during a conversation, and especially receive, from a base station, downlink information to be processed by the processor 680, and further send uplink data to the base station. Generally, the RF circuit includes but is not limited to an antenna, at least one amplifier, a transceiver, a coupler, a low noise amplifier, a duplexer, and the like. In addition, the RF circuit 610 may further interact with a network and another device by means of wireless communication.

The memory 620 may be configured to store a software program and module. By running the software program or module stored in the memory 620, and/or invoking data stored in the memory 620, the processor 680 performs various function applications and data processing of the mobile phone and may specifically perform the method according to any one of the foregoing embodiments or examples of the present disclosure. The memory 620 may include a random-access memory, a non-volatile memory, or the like. The processor 680 is a control center of the mobile phone, and is connected to each part of the entire mobile phone by using various interfaces and lines. The processor 680 may include one or more processing units, and in an implementation, may integrate an application processor and a modem.

The input unit 630 is configured to receive input information, and may be a touch panel 631 and another input device. The input unit 630 may be used as the input unit 70 in the second embodiment.

The display unit 640 is used for displaying, and may include a display panel 641. The touch panel 631 may cover on the display panel 641.

The sensor 650 may be an optical sensor, a motion sensor, or another sensor. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like.

In addition, program code used for implementing the present disclosure may be further stored in a computer readable storage medium. An example of the computer readable storage medium includes but is not limited to a magnetic disk, a magneto-optical disk, a hard disk, or the like. When read by a data processing device, the program code stored in the computer readable storage medium may perform the operations of the display control method according to the embodiments of the present disclosure.

Fourth Embodiment

Figure 11:
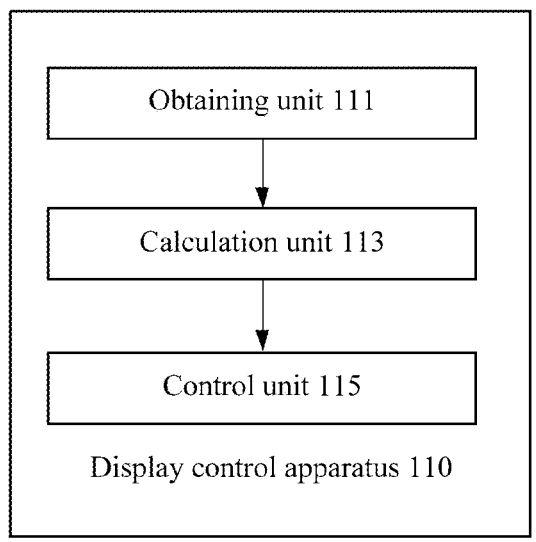
FIG. 11 is a block diagram of a display control apparatus according to a fourth embodiment of the present disclosure.

According to the fourth embodiment of the present disclosure, another display control apparatus is provided. The display control apparatus is applicable to implementing the display control method in the third embodiment. FIG. 11 is a structural block diagram of the display control apparatus. As shown in FIG. 11, the display control apparatus 110 includes: an obtaining unit 111, a calculation unit 113, and a control unit 115.

Specifically, the obtaining unit 111 is configured to obtain mobile data of a terminal, and may obtain an acceleration of the terminal in a direction of the screen, a rotation angle and the acceleration of the terminal in the direction (in the plane) of the screen, or may obtain a change value of an angle between a connection line that is between the screen of the terminal and a reference location of a user and the screen of the terminal. The obtaining unit 111 may be implemented by using the foregoing calculator and gyroscope.

The calculation unit 113 is configured to calculate a relative displacement between the terminal and the user according to the mobile data. Specifically, the calculation unit 113 calculates, according to the acceleration, a displacement of the terminal in the direction (in the plane of) of the screen, and uses the displacement as the relative displacement between the terminal and the user, or calculates, according to the acceleration and the rotation angle, a displacement of the terminal in the direction of the screen, and uses the displacement as the relative displacement between the terminal and the user. The calculation unit 113 may be implemented by using a calculator.

The control unit 115 is configured to control content displayed on the display screen of the terminal to move in a direction opposite to a direction of the relative displacement. The control unit 115 may be implemented by using a controller.

Refer to the third embodiment for understanding and implementing details of the structures of the apparatus, and details are not described herein again.

It is noted that the various modules, submodules, units and components in the present disclosure can be implemented using any suitable technology. In an example, a module or a unit can be implemented using integrated circuit (IC). In another example, a module or a unit can be implemented as processing circuitry executing software instructions.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for display control, comprising:
capturing, by a camera of a terminal device that is in use by a user, a first face image and a second face image of a face of the user;
extracting a first face fiducial of a characteristic point on the face of the user from the first face image and a second face fiducial of the characteristic point on the face of the user from the second face image;
determining a face location offset value of the face of the user based on the first face fiducial of the user and the second face fiducial of the user;
determining, based on the face location offset value, a display location offset value of content to be displayed on a display screen of the terminal device to the user; and
performing, by processing circuitry of the terminal device, a display control of the content on the display screen to the user according to the display location offset value.

2. The method according to claim 1, wherein the determining the face location offset value comprises:
obtaining a first image coordinate of the first face fiducial and a second image coordinate of the second face fiducial;
calculating a first spatial coordinate of the first face fiducial in a camera coordinate system based on the first image coordinate and a second spatial coordinate of the second face fiducial in the camera coordinate system based on the second image coordinate; and
determining a coordinate offset value of the second spatial coordinate relative to the first spatial coordinate as the face location offset value.

3. The method according to claim 2, further comprising:
receiving length measurements between a plurality of characteristic points on the face of the user.

4. The method according to claim 3, wherein the calculating the first spatial coordinate of the first face fiducial in the camera coordinate system based on the first image coordinate comprises:
normalizing first image coordinates of first face fiducials in the first face image for the plurality of characteristic points in the camera coordinate system;
calculating first unit vectors between an origin in the camera coordinate system and the first face fiducials according to the normalized first image coordinates;
calculating first angles between the first unit vectors;

calculating distances between the origin to the first face fiducials according to the received length measurements between the plurality of characteristic points and the first angles between the first unit vectors; and calculating, according to the distances between the origin to the first face fiducials and the unit vectors, first spatial coordinates that correspond to the first face fiducials in the camera coordinate system.

5. The method according to claim 1, wherein the determining the face location offset value comprises:

obtaining a first image coordinate of the first face fiducial and a second image coordinate of the second face fiducial; and determining a coordinate offset value of the second image coordinate relative to the first image coordinate as the face location offset value.

6. The method according to claim 1, wherein the determining, based on the face location offset value, the display location offset value of content comprises:

determining whether the face location offset value is greater than a offset threshold; and when the face location offset value is greater than the offset threshold, determining the display location offset value according to the face location offset value and a maximum allowable offset value.

7. The method according to claim 6, wherein the face location offset value includes at least one of an X coordinate offset value, a Y coordinate offset value, and/or a distance offset value; the offset threshold includes at least one of an X coordinate offset threshold, a Y coordinate offset threshold, and/or a distance offset threshold; and the maximum allowable offset value includes: a maximum offset value in an X axis direction and a maximum offset value in a Y axis direction; and the determining the display location offset value comprises:

determining the display location offset value in the X axis direction as a smaller one of the X coordinate offset value and the maximum offset value in the X axis direction, and/or determining the display location offset value in the Y axis direction as a smaller one of the Y coordinate offset value and the maximum offset value in the Y axis direction.

8. The method according to claim 1, further comprising:

determining a moving speed and/or an acceleration of the face location offset value of the second face fiducial relative to the first face fiducial; and determining a display location offset adjustment speed according to the moving speed and/or the acceleration.

9. The method according to claim 1, wherein the first face image and the second face image are two adjacent face images in multiple face images that are captured within a preset period or at a preset time interval.

10. The method according to claim 1, wherein the performing the display control of the content comprises at least one of:

shifting the content to be displayed on the display screen;

zooming-in the content to be displayed on the display screen; and zooming-out the content to be displayed on the display screen.

11. An apparatus, comprising:

a camera configured to capture a first face image and a second face image of a face of a user of the apparatus;

a display screen configured to display content to the user; and processing circuitry configured to:

extract a first face fiducial of a characteristic point on the face of the user from the first face image and a second face fiducial of the characteristic point on the face of the user from the second face image;

determine a face location offset value of the face of the user based on the first face fiducial of the user and the second face fiducial of the user;

determine, based on the face location offset value, a display location offset value of the content to be displayed on the display screen to the user; and perform a display control of the content to be displayed on the display screen to the user according to the display location offset value.

12. The apparatus according to claim 11, wherein the processing circuitry is configured to:

obtain a first image coordinate of the first face fiducial and a second image coordinate of the second face fiducial;

calculate a first spatial coordinate of the first face fiducial in a camera coordinate system based on the first image coordinate and a second spatial coordinate of the second face fiducial in the camera coordinate system based on the second image coordinate; and determine a coordinate offset value of the second spatial coordinate relative to the first spatial coordinate as the face location offset value.

13. The apparatus according to claim 12, wherein the processing circuitry is configured to:

receive length measurements between a plurality of characteristic points on the face of the user.

14. The apparatus according to claim 13, wherein the processing circuitry is configured to:

normalize first image coordinates of first face fiducials in the first face image for the plurality of characteristic points in the camera coordinate system;

calculate first unit vectors between an origin in the camera coordinate system and the first face fiducials according to the normalized first image coordinates;

calculate first angles between the first unit vectors;

calculate distances between the origin to the first face fiducials according to the received length measurements between the plurality of characteristic points and the first angles between the first unit vectors; and calculate, according to the distances between the origin to the first face fiducials and the unit vectors, first spatial coordinates that correspond to the first face fiducials in the camera coordinate system.

15. The apparatus according to claim 11, wherein the processing circuitry is configured to:

obtain a first image coordinate of the first face fiducial and a second image coordinate of the second face fiducial; and determine a coordinate offset value of the second image coordinate relative to the first image coordinate as the face location offset value.

16. The apparatus according to claim 11, wherein the processing circuitry is configured to determine whether the face location offset value is greater than a offset threshold, and when the face location offset value is greater than the offset threshold, determine the display location offset value according to the face location offset value and a maximum allowable offset value.

17. The apparatus according to claim 16, wherein the face location offset value includes at least one of an X coordinate offset value, a Y coordinate offset value, and/or a distance offset value; the offset threshold includes at least one of an X coordinate offset threshold, a Y coordinate offset threshold, and/or a distance offset threshold; and the maximum allowable offset value includes: a maximum offset value in an X axis direction and a maximum offset value in a Y axis direction; and the processing circuitry is configured to determine the display location offset value in the X axis direction as a smaller one of the X coordinate offset value and the maximum offset value in the X axis direction, and/or determine the display location offset value in the Y axis direction as a smaller one of the Y coordinate offset value and the maximum offset value in the Y axis direction.

18. The apparatus according to claim 11, wherein the processing circuitry is configured to:

determine a moving speed and/or an acceleration of the face location offset value of the second face fiducial relative to the first face fiducial; and determine a display location offset adjustment speed according to the moving speed and/or the acceleration.

19. The apparatus according to claim 11, wherein the first face image and the second face image are two adjacent face images in multiple face images that are captured within a preset period or at a preset time interval.

20. A non-transitory computer-readable storage medium storing instructions which when executed by a processor of a terminal device cause the processor to perform:

capturing, by a camera of the terminal device that is in use by a user, a first face image and a second face image of a face of the user;

extracting a first face fiducial of a characteristic point on the face of the user from the first face image and a second face fiducial of the characteristic point on the face of the user from the second face image;

determining a face location offset value of the face of the user based on the first face fiducial of the user and the second face fiducial of the user;

determining, based on the face location offset value, a display location offset value of content to be displayed on a display screen of the terminal device to the user; and performing a display control of the content on the display screen to the user according to the display location offset value.

* * * * *